(12) United States Patent
Swanson

(10) Patent No.: US 6,244,142 B1
(45) Date of Patent: Jun. 12, 2001

(54) TRUCK KING PIN CAP TOOL KIT

(76) Inventor: Richard C. Swanson, 5 Colony Dr., Orchard Park, NY (US) 14127

( * ) Notice: Subject to any disclaimer, the term of this patent is extended or adjusted under 35 U.S.C. 154(b) by 0 days.

(21) Appl. No.: 09/434,950

(22) Filed: Nov. 5, 1999

(51) Int. Cl.[7] .................................................. B25B 23/00
(52) U.S. Cl. ........................ 81/460; 81/439; 408/222
(58) Field of Search .......................... 81/436, 438, 439, 81/441, 460, 121.1; 7/100; 408/215, 222

(56) References Cited

U.S. PATENT DOCUMENTS

| | | | |
|---|---|---|---|
| D. 150,800 | 8/1948 | Magnus, Jr. ........................ | D93/4 |
| 1,296,279 | * 3/1919 | Friebe ................................. | 7/100 |
| 2,258,326 | * 10/1941 | Holt .................................... | 81/460 |
| 2,445,978 | * 7/1948 | Stellin ................................. | 81/460 |
| 2,480,648 | * 8/1949 | Harer .................................. | 81/441 |
| 2,764,197 | * 9/1956 | Torresen ............................. | 81/460 |
| 2,787,010 | * 4/1957 | Uphoff ............................... | 408/215 |
| 3,187,790 | * 6/1965 | Wing .................................. | 81/460 |
| 4,171,177 | * 10/1979 | Barnsdale .......................... | 408/222 |
| 4,399,723 | 8/1983 | Marleau ............................. | 81/437 |
| 4,466,315 | 8/1984 | Boschetto, Jr. et al. ........... | 81/437 |
| 4,625,599 | 12/1986 | Icard .................................. | 81/461 |
| 5,172,615 | 12/1992 | Albrecht ............................ | 81/436 |
| 5,214,987 | * 6/1993 | Fenton, Sr. ........................ | 81/460 |
| 5,388,486 | * 2/1995 | Ruzicka et al. ................... | 81/121.1 |
| 5,485,769 | 1/1996 | Olson et al. ....................... | 81/177.85 |
| 5,902,079 | * 5/1999 | Moore ............................... | 408/215 |

* cited by examiner

Primary Examiner—Eileen P. Morgan
Assistant Examiner—Joni B. Danganan
(74) Attorney, Agent, or Firm—Simpson, Simpson & Snyder, L.L.P.

(57) ABSTRACT

A king pin cap tool kit comprises a pair of cap removal tools for removing MACK® truck king pin caps of different diameters and a pair of thread chasers for repairing internal threads in steering knuckle housing bores of corresponding diameters. Each cap removal tool comprises a cylindrical body having a cruciform protrusion extending from one end face and a polygon-shaped recess through the opposite end face to adapt the cap removal tool for driving connection to a conventional pneumatic impact gun. The cruciform protrusion is uniform in its height and includes a pair of intersecting legs that extend fully across the end face in diametrical fashion. A cap removal tool having three intersecting legs is also disclosed. Each thread chaser comprises a cylindrical body having opposite end faces, a threaded peripheral surface, and polygon-shaped axial through hole for receiving a breaker bar or ratchet with extension. At least one groove, and preferably a plurality of grooves, are provided in the threaded peripheral surface from one end face to the other for channeling material removed by the thread chaser. The thread chaser has a leading thread near each end face to make it reversible in mounting on the breaker bar or ratchet.

11 Claims, 4 Drawing Sheets

TRUCK KING PIN CAP TOOL KIT

BACKGROUND

A. Field of the Invention

The present invention relates generally to the field of truck maintenance, and more particularly to tool kits for servicing front axles of MACK® trucks.

B. Description of the Prior Art

In a conventional steering knuckle assembly at the front axle of a MACK® truck, a tapered knuckle pin is adjustably held within a downwardly open bore in the knuckle assembly housing by a thrust bearing, which in turn is secured by a thrust bearing adjusting screw, commonly referred to as a king pin cap. The king pin cap is an externally-threaded cylindrical slug which mates with an internally threaded wall of the bore in the knuckle assembly housing, and is provided with a cruciform recess in its bottom face for receiving a torque-applying tool, whereby the king pin cap may be removed from threaded engagement within the bore during servicing. Since the king pin cap and mating threads of the bore are open downwardly toward road or highway surfaces, they are exposed to water, salt, dirt and other elements which cause oxidation of or otherwise degrade the threaded connection. Consequently, removal of the king pin cap is often very difficult.

Under prior art practice in use for over half a century, an adapter 2 as shown in FIG. 1 was used in combination with a manual torque wrench to remove the king pin cap. The adapter 10 of the prior art includes four separate protrusions 12, 13, 14, and 15 spaced radially from an axis of rotation of the adapter and arranged every 90 degrees about the axis of rotation, whereby two diametrically opposed protrusions 12 and 14 are received within one intersecting leg of the cruciform recess and two diametrically opposed protrusions 13 and 15 are received within the other intersecting leg of the cruciform recess. Adapter 10 also includes a polygon-shaped hub 16 for engaging a torque wrench for manual rotation. Prior art adapters of this type have certain recognized disadvantages. For example, protrusions 12–15 are prone to camming action or "walking" and becoming dislodged from the king pin cap recess. Also, the protrusions are prone to shearing and can cause damage to the king pin cap recess. These disadvantages are particularly evident when a high level of torque is required to remove the king pin cap, a situation which calls for a long torque wrench. For this reason, service personal have heretofore been instructed not to use a high-torque pneumatic impact gun to drive adapters of this type.

Also under prior art practice, a machine tool tap is commonly used to clear and restore the internal threads of the bore, however such taps are not adapted for use with manual torque means found in a truck servicing garage.

SUMMARY OF THE INVENTION

Accordingly, it is a primary object of the present invention to provide improved tooling for removing the king pin cap of a MACK® truck and repairing the internal threads in the knuckle housing. More specifically, the tool kit of the present invention is intended to eliminate the problems of walking, tool damage, and king pin cap recess damage, while allowing the use of of a high-torque pneumatic impact gun to save time and effort.

A king pin cap tool kit formed in accordance with a preferred embodiment of the present invention comprises a pair of cap removal tools for removing king pin caps of different diameters and a pair of thread chasers for repairing internal threads in housing bores of corresponding diameters. Each cap removal tool comprises a cylindrical body having opposite end faces, a cruciform protrusion extending from one of the end faces, and a polygon-shaped recess through the opposite end face to adapt the cap removal tool for driving connection to a conventional pneumatic impact gun. The cruciform protrusion is uniform in its height and includes a pair of intersecting legs that extend fully across the end face in diametrical fashion. Each thread chaser comprises a cylindrical body having opposite end faces, a threaded peripheral surface, and polygon-shaped axial through hole for receiving a breaker bar or ratchet with extension. At least one groove, and preferably a plurality of grooves, are provided in the threaded peripheral surface from one end face to the other for channeling material removed by the thread chaser. The thread chaser has a leading thread near each end face to make it reversible in mounting on the breaker bar or ratchet.

BRIEF DESCRIPTION OF THE DRAWINGS

The nature and mode of operation of the present invention will now be more fully described in the following detailed description of the preferred embodiment taken with the accompanying drawing figures, in which.

DETAILED DESCRIPTION OF THE PREFERRED EMBODIMENT

Figure 1:
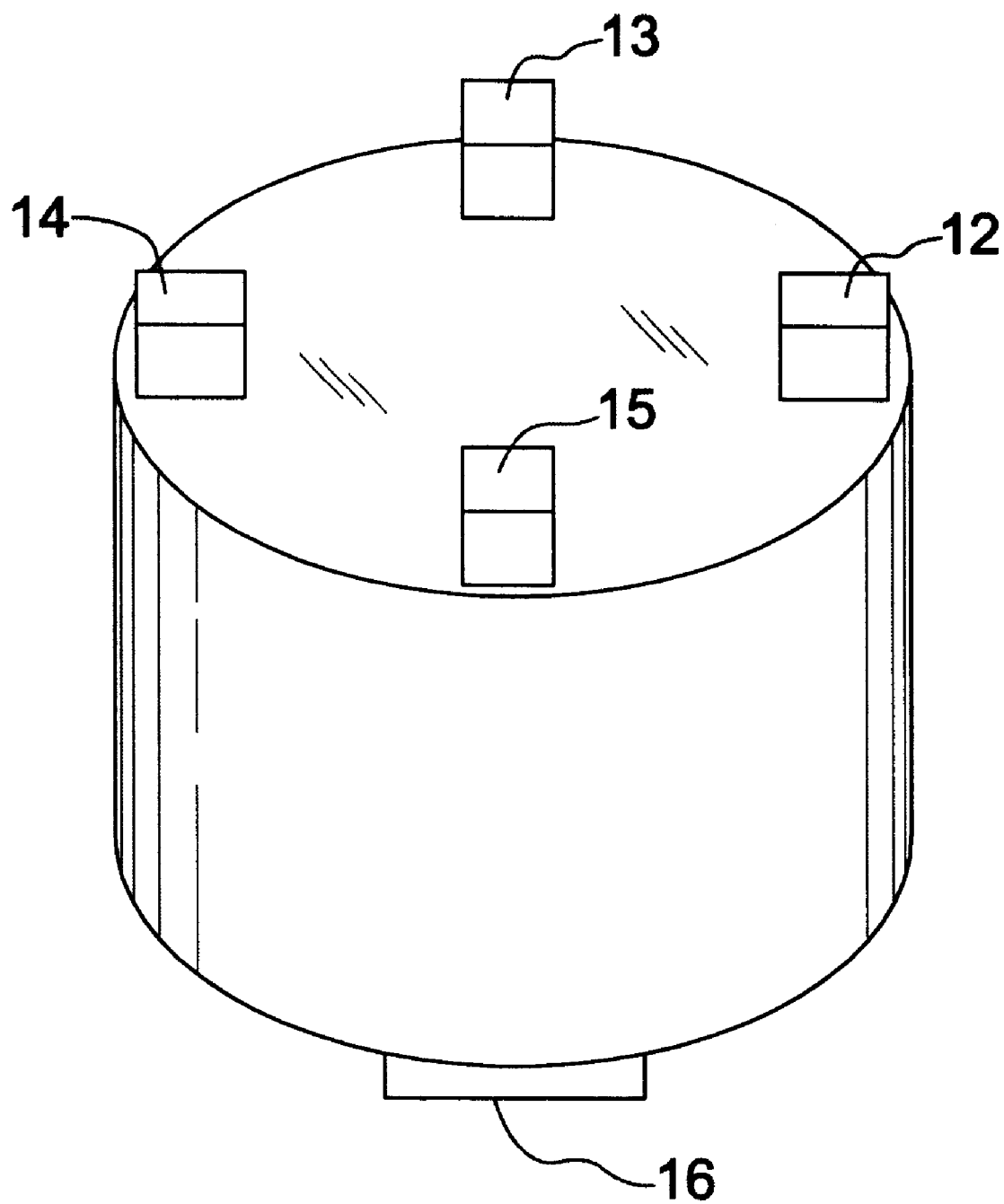
FIG. 1 is a perspective view illustrating a prior art adapter used in cooperation with a manual torque wrench to remove a king pin cap in accordance with long-standing practice.
Figure 2:
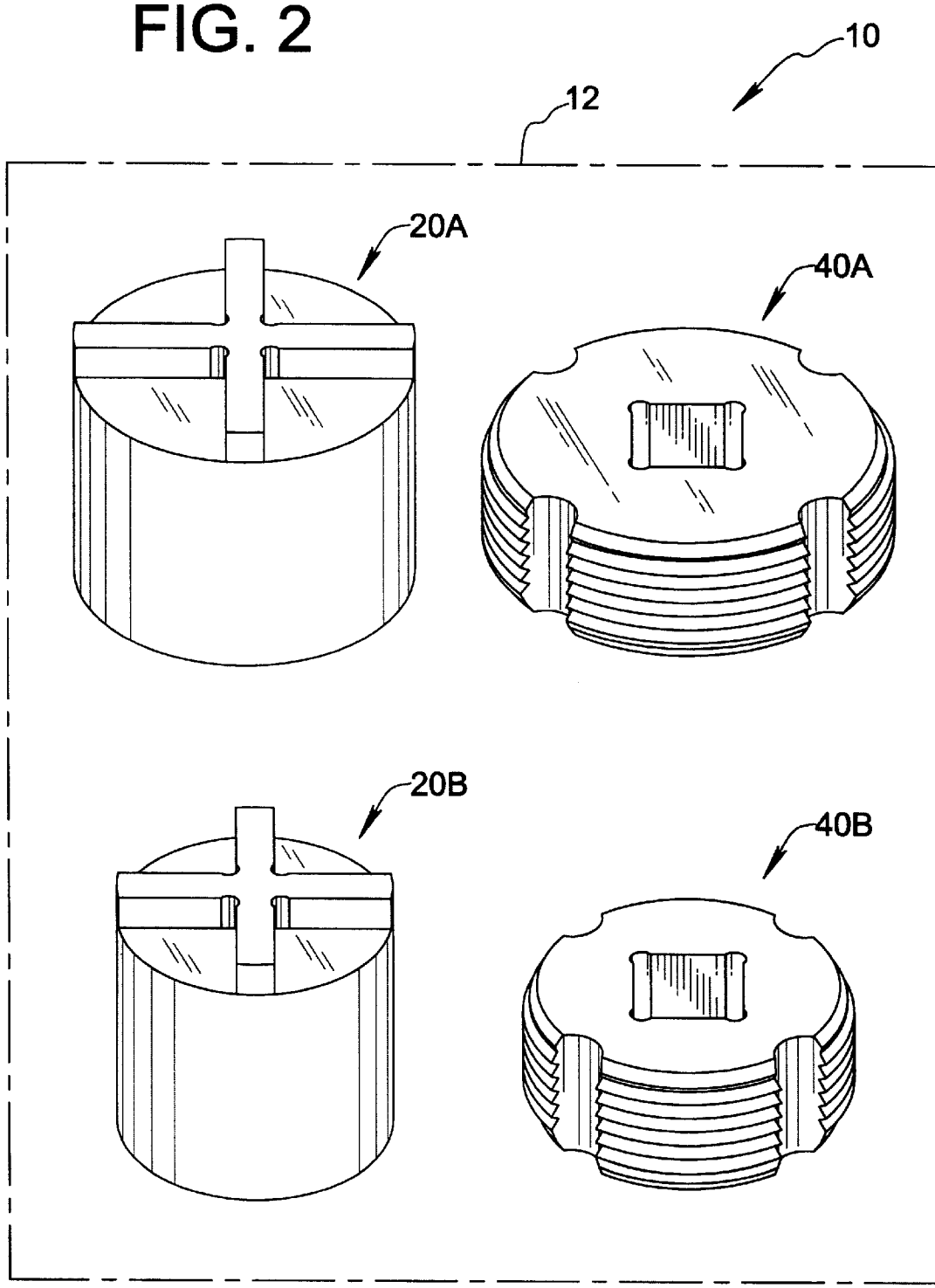
FIG. 2 is a perspective view showing a king pin cap tool kit formed in accordance with a preferred embodiment of the present invention.

Referring now to FIG. 2 of the drawings, a king pin cap tool kit formed in accordance with a preferred embodiment of the present invention is shown and identified generally by the reference numeral 10. Tool kit 10 comprises a pair of cap removal tools 20A and 20B, and a pair of corresponding thread chasers 40A and 40B. Cap removal tool 20A and thread chaser 40A are sized for performing service on MACK® truck steering knuckle assemblies of 16-, 18-, and 20,000 pound front axles, while cap removal tool 20B and thread chaser 40B are sized for performing service on MACK® truck steering knuckle assemblies of front axles specified at up to 14,300 pounds. Cap removal tools 20A, 20B and thread chasers 40A, 40B are stored in a suitable storage box or container 12, illustrated schematically by broken line for sake of simplicity.

Figure 3:
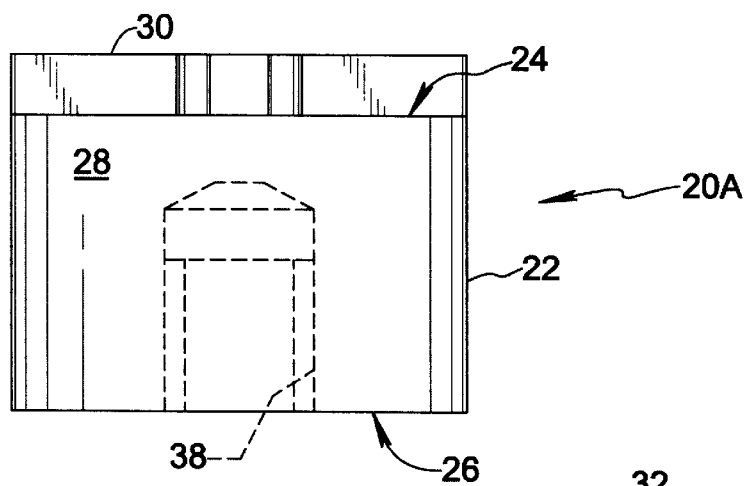
FIG. 3 is a side elevational view of a cap removal tool included in the king pin cap tool kit shown in FIG. 2.
Figure 4:
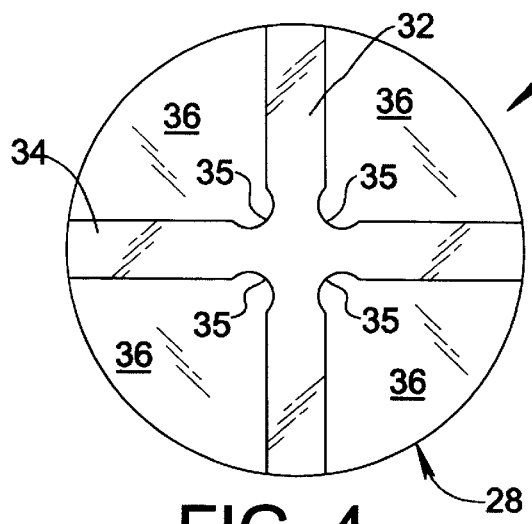
FIG. 4 is a first end view of the cap removal tool shown in FIG. 3.
Figure 5:
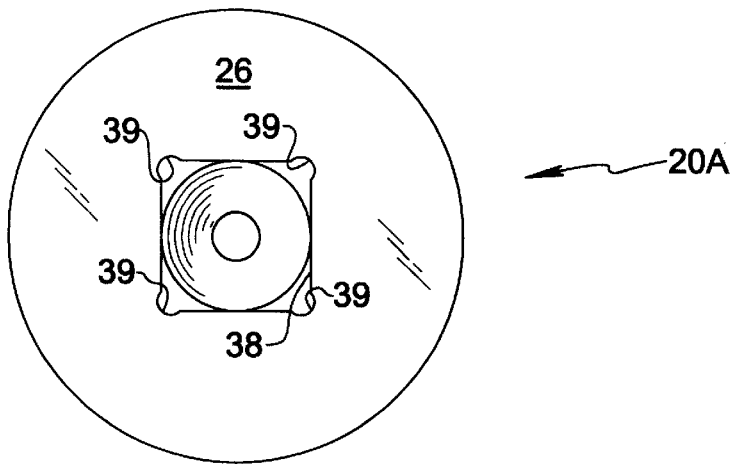
FIG. 5 is a second end view of the cap removal tool shown in FIG. 3.

Cap removal tool 20A will now be described in detail making reference to FIGS. 3–5, with it being understood that cap removal tool 20B is similar to cap removal tool 20A in all respects except for overall diameter. Cap removal tool 20A includes a cylindrical body 22 having a first end face 24 and a second end face 26. As used herein, the term "cylindrical" means uniform in cross-section, and does not limit the cross-sectional shape of body 22 to a circle. First end face 24 and second end face 26 are connected by a peripheral surface 28 that extends in an axial direction of body 22. A cruciform protrusion 30 extends from first end face 24 in a direction normal thereto, and includes a pair of legs 32 and 34 intersecting at the geometric center of first end face 24. Four relief radii 35 are preferably provided at the intersection of legs 32 and 34. Protrusion 30 is sized to be complementary to the cruciform recess in the king pin cap so that it completely fills the cruciform recess when inserted therein, with slight clearance between side walls of protrusion 30 and the recess being allowed to facilitate insertion. In the preferred embodiment, legs 32 and 34 extend diametrically across first end face 24 such that they intersect at a central rotational axis of cap removal tool 20A and opposite ends of each leg are even or flush with peripheral surface 28. In this regard, protrusion 30 can be formed by milling four identical wedge-shaped regions 36 of appropriate depth from an end face of a cylindrical metal slug, preferably 4140 or 4142 steel heat treated, double tempered and drawn down to about 38–40 Rockwell C hardness. Cap removal tool 20A is adapted for driven rotation about its central axis by provision of a polygon-shaped recess 38 extending axially through second end face 26 and terminating short of first end face 24. In the preferred embodiment, the peripheral shape of recess 38 is a square having relief radii 39 at each of its four corners. Recess 38 is sized to receive a drive element of a conventional high-torque pneumatic impact gun, most preferably a ¾ inch impact gun, for automatically rotating cap removal tool 20A.

Figure 8:
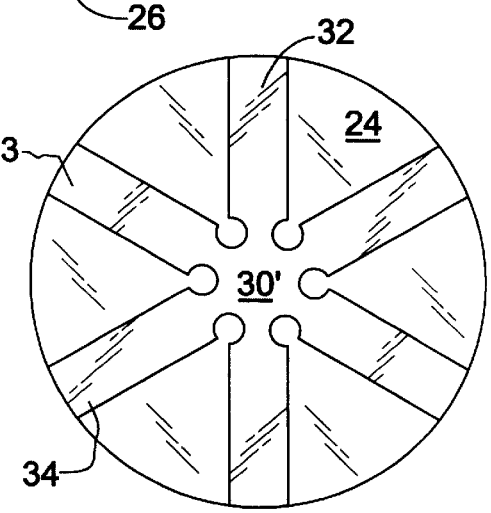
FIG. 8 is an end view of a cap removal tool formed in accordance with an alternative embodiment of the present invention.

Cap removal tools 20A and 20B are of course designed with two perpendicular legs 32 and 34 for fitting existing ling pin caps having a corresponding recess. However, FIG. 8 depicts a cap removal tool according to an alternative embodiment wherein three legs 32, 33, and 34 intersect to form a torque transmitting protrusion 30' on first end face 24, with six relief radii being provided about the centrally located intersection. The legs are arranged in equal angular increments about the central rotational axis of cap removal tool 20C where the legs intersect. This configuration is intended to fit potentially new king pin caps having a corresponding "three leg" recess for improved torque transmission.

Figure 6:
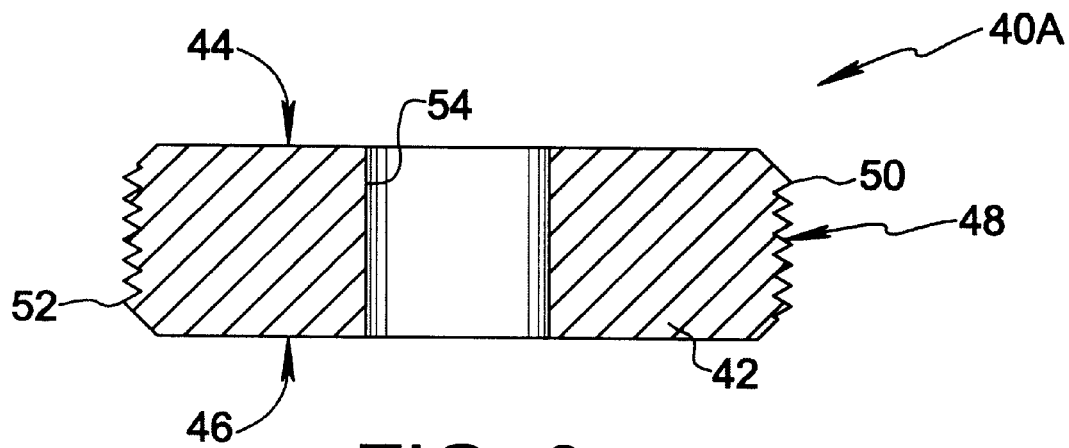
FIG. 6 is a cross-sectional view of a thread chaser included in the king pin cap tool kit shown in FIG. 2.
Figure 7:
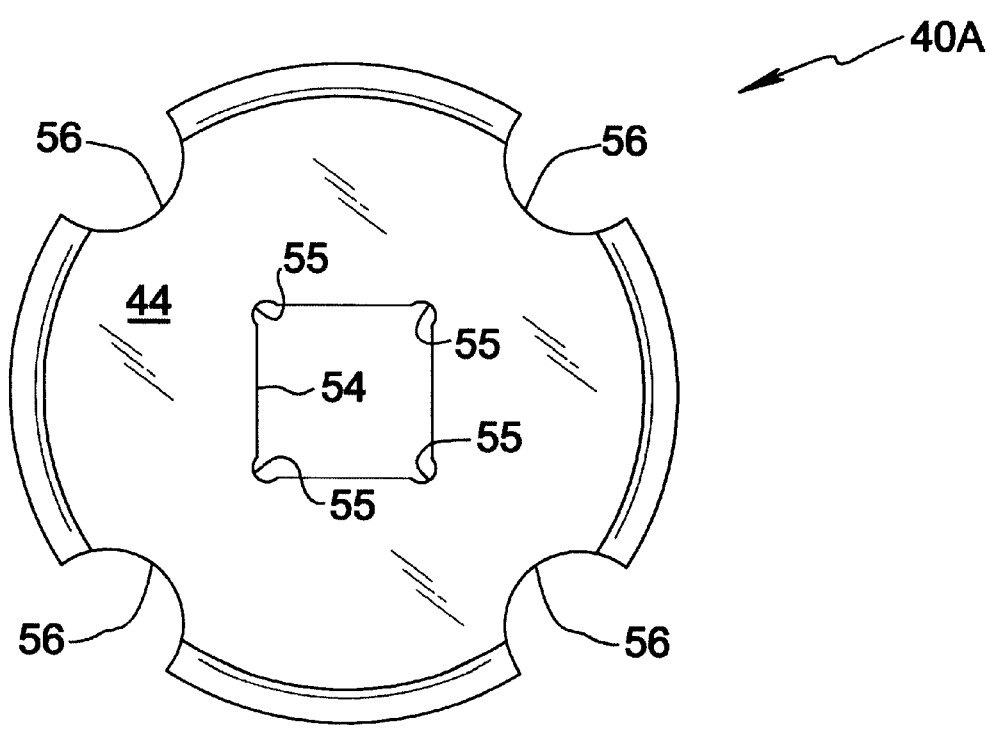
FIG. 7 is an end view of the thread chaser shown in FIG. 6.

Thread chaser 40A will now be described in detail making reference to FIGS. 6 and 7, with it being understood that thread chaser 40B is similar to thread chaser 40A in all respects except overall diameter. Thread chaser 40A includes a cylindrical body 42 having a first end face 44 and a second end face 46 connected by a threaded peripheral surface 48 that extends in an axial direction of body 42. Body 42 is manufactured from a cylindrical metal slug, preferably 4140 or 4142 steel heat treated, double tempered and drawn down to about 53–55 Rockwell C hardness. As can be seen in FIG. 6, thread chaser 40A further includes a first lead thread 50 near first end face 44 and a second lead thread 52 near second end face 46. Thread chaser 40A is provided with a polygon-shaped through hole 54 extending along a central rotational axis thereof from first end face 44 to second end face 46. Through hole 54 is intended to receive a breaker bar or ratchet with extension for manual rotation of the thread chaser to clear and recondition damaged internal threads which mate with external threads on the king pin cap. Through hole 54 preferably matches polygon-shaped recess 38 of cap removal tool 20A in peripheral size and shape, and has relief radii 55 at the corners thereof In order to channel away debris and material from the internal threads in the bore, a plurality of grooves 56 interrupt threaded peripheral surface 48 at regular circumferential locations. Grooves 56 extend in an axial direction of body 42 from first end face 44 to second end face 46, and may be formed as semi-circular drilled holes at the peripheral edge of body 42. As will be appreciated, through hole 54 enables torque to be applied through either first end face 44 or second end face 46, with first lead thread 50 or second lead thread 52 respectively engaging the internal thread of the bore, whereby thread chaser 40A is fully reversible and thus has an extended life.

To use the tool kit of the present invention, an appropriately sized cap removal tool 20A or 20B is chosen and mounted by way of polygon-shaped recess 38 on a pneumatic impact gun. The cruciform protrusion 30 is fit into the corresponding cruciform recess in the king pin cap and reverse (counter-clockwise) torque is applied to remove the cap from threaded engagement. The appropriately sized thread chaser 40A or 40B is then mounted on a ratchet by way of through hole 54, positioned at the entrance to the internally threaded bore, rotated forward (clockwise) until through the internally threaded portion of the bore, and then rotated in reverse direction to remove it from the bore. When servicing of the knuckle assembly is complete, the king pin cap may be securely threaded back into the bore using the cap removal tool with forward torque applied by the impact gun.

What is claimed is:

1. A kit for servicing a steering knuckle assembly of a truck comprising, in combination:

a cap removal tool including a cylindrical body having first and second end faces connected by an axially extending peripheral surface, a cruciform protrusion on said first end face having a pair of intersecting legs, and a polygon-shaped recess extending axially through said second end face; and a thread chaser including a cylindrical body having first and second end faces connected by a threaded axially-extending peripheral surface, and a polygon-shaped hole extending axially through said body of said thread chaser from said first end face of said thread chaser to said second end face of said thread chaser, wherein said polygon shaped hole corresponds to said polygon-shaped recess of said cap removal tool.

2. The combination according to claim 1, wherein each of said pair of intersecting legs extends diametrically across said first end face of said cap removal tool.

3. The combination according to claim 2, wherein said pair of intersecting legs are provided with four relief radii at their intersection.

4. The combination according to claim 2, wherein said cruciform protrusion has a uniform height.

5. The combination according to claim 1, wherein said polygon-shaped recess of said cap removal tool and said polygon-shaped hole of said thread chaser are in the shape of a square.

6. The combination according to claim 5, wherein said square recess includes a relief radius at each of its four corners.

7. The combination according to claim 1, wherein said polygon-shaped recess of said cap removal tool and said polygon-shaped hole of said thread chaser are equal in peripheral size and shape.

8. The combination according to claim 1, wherein said thread chaser includes at least one groove in said threaded peripheral surface extending from said first end face of said thread chaser to said second end face of said thread chaser for passage of removed material.

9. The combination according to claim 1, wherein said thread chaser includes a first lead thread near said first end face and a second lead thread near said second end face, whereby said thread chaser is reversible.

10. The combination according to claim 1, wherein said combination comprises a plurality of said cap removal tools having different outer diameters and a corresponding plurality of said thread chasers having different outer diameters.

11. The combination according to claim 10, wherein said polygon-shaped recess of each of said plurality of said cap removal tools and said polygon-shaped hole of each of said plurality of thread chasers are equal in peripheral size and shape.

* * * * *